(12) United States Patent
Pulina et al.

(10) Patent No.: US 7,833,333 B2
(45) Date of Patent: Nov. 16, 2010

(54) LOW MIGRATION, LOW ODOR OFFSET INKS OR VARNISHES

(75) Inventors: Tillmann Pulina, Nidderau-Heldenbergen (DE); Wolfram Falkenberg, Bad Vilbel (DE)

(73) Assignee: Sun Chemical Corporation, Parsippany, NJ (US)

( * ) Notice: Subject to any disclaimer, the term of this patent is extended or adjusted under 35 U.S.C. 154(b) by 584 days.

(21) Appl. No.: 10/591,927

(22) PCT Filed: Mar. 14, 2005

(86) PCT No.: PCT/US2005/008504

§ 371 (c)(1),
(2), (4) Date: Aug. 8, 2007

(87) PCT Pub. No.: WO2005/090498

PCT Pub. Date: Sep. 29, 2005

(65) Prior Publication Data

US 2008/0022891 A1   Jan. 31, 2008

(30) Foreign Application Priority Data

Mar. 12, 2004  (GB)  ................. 0405658.6

(51) Int. Cl.
C09D 11/00       (2006.01)
(52) U.S. Cl. .................................. 106/31.13
(58) Field of Classification Search ............... 106/31.13
See application file for complete search history.

(56) References Cited

U.S. PATENT DOCUMENTS

| | | | | |
|---|---|---|---|---|
| 2,389,781 A | * | 11/1945 | Isenberg | ............... 252/301.36 |
| 3,665,060 A | * | 5/1972 | Bergomi et al. | ............. 525/201 |
| 4,627,876 A | | 12/1986 | Fries et al. | |
| 5,075,366 A | * | 12/1991 | Moltrasio | .................... 524/306 |
| 5,507,864 A | | 4/1996 | Jaeger et al. | |
| 5,965,633 A | | 10/1999 | Revol | |
| 6,176,914 B1 | | 1/2001 | Feustel et al. | |
| 6,284,720 B1 | * | 9/2001 | Opre | ........................... 510/170 |
| 6,613,813 B1 | | 9/2003 | Borgmann et al. | |
| 6,932,465 B2 | * | 8/2005 | Nito et al. | ...................... 347/96 |
| 2004/0028640 A1 | * | 2/2004 | Arnaud et al. | ........... 424/70.31 |
| 2004/0086603 A1 | | 5/2004 | Shastry et al. | |
| 2005/0131103 A1 | | 6/2005 | Hassan et al. | |
| 2005/0250875 A1 | | 11/2005 | Marr et al. | |

FOREIGN PATENT DOCUMENTS

| | | | | |
|---|---|---|---|---|
| DE | 2118785 | | | 10/1972 |
| DE | 19516028 | | | 11/1996 |
| DE | 10208013 | | | 10/2003 |
| JP | 07157508 | | | 12/1995 |
| JP | 2002121452 | | | 4/2002 |
| JP | 2003064284 | | | 3/2003 |
| JP | 2005022891 | A | * | 1/2005 |
| WO | WO2005042655 | | | 5/2005 |
| WO | WO2005044924 | | | 5/2005 |
| WO | WO2005090498 | | | 9/2005 |

OTHER PUBLICATIONS

International Search Report, for PCT Application No. PCT/US2005/008504, dated Jun. 9, 2005.
International Search Report and Written Opinion issued for International Application No. PCT/US2007/076751, dated Dec. 6, 2007.
European Search Report, Issued for corresponding PCT Application No. PCT/US2007/076751, dated May 8, 2009.
Great Britain Search Report, dated Aug. 16, 2004.

* cited by examiner

Primary Examiner—Melvin C Mayes
Assistant Examiner—Melissa Stalder
(74) Attorney, Agent, or Firm—Kramer Levin Naftalis & Frankel LLP

(57) ABSTRACT

An offset printing ink or varnish uses as a solvent at least one water-insoluble ester of a polycarboxylic acid with an alcohol having at least 4 carbon atoms.

17 Claims, No Drawings

LOW MIGRATION, LOW ODOR OFFSET INKS OR VARNISHES

The present invention relates to novel low migration, low odour inks useful for offset lithographic printing, especially sheetfed offset lithographic printing.

Sheetfed offset lithography is the dominant printing process for the printing of folding cartons for many purposes, including for use as food packaging. However, where an ink is to be used on food packaging, it is essential, from the point of view of customer acceptance, that it should not contaminate the food or impart any unnatural odour to it. Moreover, there is an increasing tendency for legislation to prescribe very low levels of contaminants in foods and other matter which could affect public health. Contamination, in this context, can result from migration of components of an ink into the foodstuff or other packaged material or from undesirable odours imparted to the packaged material by the ink.

There is, therefore, a need for a printing ink which can be used for sheetfed offset lithography and which allows little or no migration of its components whilst being essentially odourless or having little odour. The nature of the offset lithography process also implies severe restrictions on the ink formulation, as explained in *The Printing Ink Manual* by R. H. Leach et al. [Fifth edition (1993) pages 342-346], and meeting all of these requirements is not an easy task.

One of the main odorous components of offset inks is the solvent used. It is in the nature of offset lithography that the solvent must be organic and insoluble in water. Many solvents having these properties are not only highly odorous but also many of them are toxic to a greater or lesser extent. The choice of solvents for this purpose is, therefore, highly restricted.

U.S. Pat. No. 6,613,813 attempts to overcome these problems by the use, inter alia, of a solvent comprising an ester of a multivalent alcohol with a fatty acid. The composition can optionally contain a multifunctional allyl ester of a multivalent organic acid; however, the function of these esters is to enhance the drying process by undergoing oxidative drying, rather than to serve as a substantial part of the solvent system. Whilst the solution proposed in U.S. Pat. No. 6,613,813 is effective, the Examples of the patent seem to suggest that an additional drying agent is necessary to achieve the required drying in a reasonable time.

We have now discovered that a class of compounds based on polycarboxylic acids are useful as solvents for offset printing inks and are capable giving a number of improvements over the known inks of U.S. Pat. No. 6,613,813, including equivalent or lower odour, equivalent or lower migration, and equivalent or improved stability on the press.

Thus, the present invention consists in an offset printing ink or varnish, particularly useful in sheetfed offset lithographic printing, characterised in that the solvent comprises at least one water-insoluble ester of a polycarboxylic acid with a monohydric alcohol having at least 4 carbon atoms.

As the oxidative drying process and the by-products generated by it are an important source of odour development in finished prints, a careful selection of raw materials is necessary. Driers as well as raw materials with oxidative drying potential as used in conventional sheetfed offset inks should preferably be excluded. Good rub resistance of the print job may be achieved by using the inks of the present invention in combination with a water based overprint varnish (OVP).

The composition of printing inks or varnishes for offset lithographic printing, including sheetfed offset lithographic printing, is very well known, and is described in considerable detail in, for example, *The Printing Ink Manual* (supra) pages 342-452, and in U.S. Pat. No. 5,382,282, No. 5,725,646 and No. 6,489,375.

In general terms, a lithographic printing ink should have a low surface tension, be water-repellent, be capable of emulsifying with a fount solution, and, for conventional sheetfed offset lithography, must be capable of drying without radiation. These very particular requirements are met by careful formulation and choice of the various components and is well known in the printing ink industry.

The solvent used in the ink or varnish composition of the present invention is a water-insoluble ester of a polycarboxylic acid with an alcohol having at least 4 carbon atoms. The polycarboxylic acid may be aromatic or aliphatic, although it is preferably aromatic, and should have more than one carboxylic acid group. Preferably, the acid has from 2 to 4, more preferably 3, carboxylic acid groups.

Examples of aromatic polycarboxylic acids include: trimellitic acid, phthalic acid, isophthalic acid, terephthalic acid, 1,2,3-benzenetricarboxylic acid, 1,2,4-benzenetricarboxylic acid, 1,3,5-benzenetricarboxylic acid, 1,2,3,4-benzenetetracarboxylic acid, 1,2,3,5-benzenetetracarboxylic acid, 1,2,4,5-benzenetetracarboxylic acid, 1,3,5-naphthalenetricarboxylic acid, 1,3,6-naphthalenetriacetic acid, 6-carboxy-1-(carboxymethyl)-2-naphthalenepropionic acid, 1,4,5,8-naphthalenetetracarboxylic acid, 3,3',4,4'-biphenyltetracarboxylic acid and 3,4,9,10-perylenetetracarboxylic acid. Of these, trimellitic acid is preferred.

Examples of aliphatic polycarboxylic acids include: dicarboxylic acids, such as oxalic acid, malonic acid, succinic acid, glutaric acid, adipic acid, pimelic acid, suberic acid, azelaic acid, sebacic acid, tartronic acid, malic acid and tartaric acid; tricarboxylic acids, such as citric acid, acetylcitric acid, 2-hydroxy-2-methylpropane-1,2,3-tricarboxylic acid, pentane-1,3,5-tricarboxylic acid, 1,2,3-propanetricarboxylic acid, and 7-methyl-1,7,9-decanetricarboxylic acid; and tetracarboxylic acids, such as 1,2,3,4-butanetetracarboxylic acid, cyclopentane-1,2,3,4-tetracarboxylic acid, 2,3,4,5-tetracarboxytetrahydrofuran, and 1,1,12,12-dodecanetetracarboxylic acid.

The monohydric alcohol with which these polycarboxylic acids form esters has at least 4 carbon atoms, and preferably from 4 to 20, more preferably from 4 to 18, and still more preferably from 6 to 10, carbon atoms. Examples of such alcohols include: butanol, sec-butanol, t-butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, icosanol, hexan-2-ol, 2,3-dimethylbutan-2-ol, 3-methyl-pentan-1-ol, 3,3-dimethylbutan-2-ol, and 2,3,3-trimethylbutan-2-ol.

A particularly preferred polycarboxylic acid ester solvent in accordance with the present invention is that sold under the trade name Uraplast 525 by DSM Resins bv. This is a low viscosity trialkyl trimellitate based on $C_8$-$C_{10}$ alcohols. It has previously been used as a plasticiser. Other suitable solvents include tridecyl trimellitate, tributyl citrate and acetyl tributyl citrate.

In order that the ester of the polycarboxylic acid and the monohydric alcohol should be able to function as a solvent, it is normally important that its molecular weight be within a specific range. In general, a molecular weight of at least 250, and more preferably at least 300, is preferred, the maximum preferred molecular weight being 1000. Thus, the molecular weight is preferably from 250 to 1000, more preferably from 300 to 1000 and still more preferably from 500 to 800.

Although the polycarboxylic acid ester may be used as the sole solvent in the compositions of the present invention, it may be necessary, in order to achieve the correct rheological properties, to include also another solvent. This other solvent, if present, preferably does not exceed 60% of the total solvent present in the composition. More preferably, from 45% to 90%, still more preferably from 50% to 80%, and most preferably from 55% to 65%, by weight of said solvent comprises the polycarboxylic acid ester.

If another solvent is present, any solvent conventionally used in lithographic inks may be employed, provided that it has no oxidative drying potential and that it that it does not tend to migrate from the dried ink. Examples of such other solvents include triglycerides of $C_8$-$C_{20}$ aliphatic carboxylic acids, for example, coconut oil, such as that sold under the trade name Kokosol by Lechner and Crebert.

The solvent, or mixture of solvents, used in the present invention preferably has a melting point such that it is liquid at the temperature at which the printing ink or varnish is to be used. This normally means that it should be liquid at the temperature of the printing press, and preferably at ambient temperature, e.g. at temperatures above 10-15° C. In some cases, however, for example if the printing ink or varnish is to be used only in a warm atmosphere, it may be possible that the solvent is solid at these temperatures, provided that it melts at a somewhat higher temperature, for example about 25° C.

The resin component in a lithographic ink composition or varnish functions, among other things, as a film former to bind the varnish and pigment together and, when the ink or varnish dries, to bind the same to the receiving substrate. The resin component also contributes to the properties of hardness, gloss, adhesion and flexibility of an ink and must be compatible with the solvent component of the varnish. In conventional oleoresinous systems, the resin component commonly comprises a first or hard resin component and a second resin component which typically is an alkyl or polyester resin, but which can comprise various other compositions and resins as well.

Hard resins usable in the lithographic inks or varnishes of the present invention include, for example, natural or processed resins such as rosins, rosin esters, maleic modified resins, rosin modified fumaric resins, dimerised and polymerised rosins, phenolics, rosin modified phenolics, terpenes, polyamides, cyclised rubber, acrylics, hydrocarbons and modified hydrocarbons. Also included among the available resins are those identified in *The Printing Ink Manual*, supra, the substance of which is incorporated herein by reference.

The lithographic inks of the present invention will usually include at least one pigment, the nature of which is not critical to the present invention, and which may be chosen from any of those pigments well known to those skilled in the art. Alternatively, the ink may include an extender. Varnishes will not normally include any pigment or extender in their composition.

In addition, there may, if desired, be present other additives, such as antioxidants, waxes, anti-set-off compounds, lithographic additives and rheology modifiers. These are likewise well known to those skilled in the art.

The invention is further illustrated by the following non-limiting Examples.

EXAMPLES 1-4

Preparation of Inks

The components shown in the following Table 1 were blended as described below to produce inks suitable for use in sheet fed offset lithographic printing.

TABLE 1

| | | | Example No. | | | |
|---|---|---|---|---|---|---|
| Name | Supplier | Material | 1 Yellow | 2 Magenta | 3 Cyan | 4 Black |
| Talkum Finntalk M 05 | Omya | Talcum | 2.00 | 1.00 | — | — |
| Aerosil R 972 V | Fischer | Pigment White 27 | 1.10 | 1.10 | 2.10 | 1.10 |
| Irgalith LB1W | Ciba | Pigment Yellow 13 | 6.00 | — | — | — |
| Permanent Yellow GRX 86 | Clariant | Pigment Yellow 176 | 6.00 | — | — | — |
| Diacetanil Orange R 3426C | Capelle | Pigment Orange 34 | 0.04 | — | — | — |
| Symuler Brilliant Carmin 6B 308 | DIC | Pigment Red 57:1 | — | 8.00 | — | 1.00 |
| Symuler Brilliant Carmin 6B 303 | DIC | Pigment Red 57:1 | — | 8.00 | — | — |
| Fastogen Blue H 5375 SD | DIC | Pigment Blue 15:3 | — | — | 16.00 | 4.00 |
| Russ Elftex 415 | Cabot | Pigment Black 7 | — | — | — | 8.50 |
| Russ Printex 25 | Degussa | Pigment Black 7 | — | — | — | 8.50 |
| Tergraf ND 2030 | Cray Valley | Phenolic modified rosin ester | 13.40 | 12.70 | 13.00 | 11.80 |
| Tergraf 902 | Cray Valley | Phenolic modified rosin ester | 13.40 | 12.70 | 13.00 | 11.80 |
| Uraplast 525 | DSM | Trialkyl trimellitate | 31.40 | 31.10 | 29.70 | 29.50 |
| Coconut oil | Lechner & Crebert | Coconut oil refined | 24.75 | 23.52 | 24.31 | 21.96 |
| Printwax ME 0520 | Deurex | Polyethylene | 1.20 | 1.20 | 1.20 | 1.20 |
| Additol VXL 12 | Surface Chemie | Aluminium gelling agent | 0.61 | 0.58 | 0.59 | 0.54 |
| MTBHQ | Eastman | t-butylhydroquinone | 0.10 | 0.10 | 0.10 | 0.10 |
| Total | | | 100.00 | 100.00 | 100.00 | 100.00 |

The coconut oil and approximately one half of the Uraplast 525 were added to a reaction vessel, stirred and heated to 180° C. Tergraf ND 2030 and Tergraf 902 were then added, ensuring that the temperature did not fall below 160° C. The mixture was heated up to 180° C. and held at that temperature for 60 minutes. Approximately another one half of the total amount of the Uraplast 525 was then added and the mixture was allowed to cool to 160° C. The gelling agent was then added with quick stirring, and the whole varnish was heated to 180° C. and maintained at that temperature for 30 minutes. External cooling then reduced the temperature to 110° C., and the varnish was discharged from the reaction vessel.

The pigment(s) and other solid components (except the polyethylene wax) were dispersed in the varnish and the mixture was thoroughly mixed with a triple roller mill. The polyethylene wax was then added and the mixture was again passed over the triple roller mill for de-airing. The viscosity and tack were adjusted, prior to de-airing, by addition of small amounts of the trialkyl trimellitate, to give the final composition shown in Table 1.

EXAMPLE 5

Preparation of Ink

The following components were mixed to form a magenta ink, following essentially the same procedure as described in Examples 1-4. The amounts are parts by weight.

| Name | Supplier | Material | Amount |
| --- | --- | --- | --- |
| Citrofol B1 | Jungbunzlauer | Tributyl citrate | 23.10 |
| Beckosol HS 201-100 | Reichhold | Unsaturated polyester | 10.00 |
| | | Sodium aluminium silicate | 0.80 |
| Talkum Finntalk M 05 | Omya | Talc | 1.00 |
| Symuler Brilliant Carmine | DIC | PR 57:1 | 16.50 |
| Coconut oil | Lechner & Crebert | Coconut oil refined | 23.50 |
| Krumbhaar LR 10040 | Eastman | Phenolic modified rosin ester | 8.20 |
| Tergraf 902 | Cray Valley | Phenolic modified rosin ester | 16.40 |
| Additol VXL 12 | Surface Chemie | Aluminium gelling agent | 0.50 |
| | | | 100.00 |

EXAMPLE 6

Preparation of Ink

The following components were mixed to form a magenta ink, following essentially the same procedure as described in Examples 1-4. The amounts are parts by weight.

| Name | Supplier | Material | Amount |
| --- | --- | --- | --- |
| Citrofol BII | Jungbunzlauer | Acetyltributyl citrate | 17.90 |
| Citrofol BI | Jungbunzlauer | Tributyl citrate | 4.20 |
| Foralyn 5020 F | Eastman | Hydrogenated resin | 10.00 |
| | | Sodium aluminium silicate | 0.80 |
| Talkum Finntalk M 05 | Omya | Talc | 1.00 |
| Symuler Brilliant Carmine 6B 305 | DIC | PR 57:1 | 16.50 |
| Coconut oil | Lechner & Crebert | Coconut oil refined | 24.50 |
| Krumbhaar LR 10040 | Eastman | Phenolic modified rosin ester | 11.50 |
| Tergraf 902 | Cray Valley | Phenolic modified rosin ester | 13.10 |
| Additol VXL 12 | Surface Chemie | Aluminium gelling agent | 0.50 |
| | | | 100.00 |

EXAMPLE 7

Preparation of Ink

The following components were mixed to form a magenta ink, following essentially the same procedure as described in Examples 1-4. The amounts are parts by weight.

| Name | Supplier | Material | Amount |
| --- | --- | --- | --- |
| Citrofol B1 | Jungbunzlauer | Tributyl citrate | 20.90 |
| Uraplast 525 | DSM | Trialkyl mellitate | 10.00 |
| | | Sodium aluminium silicate | 0.80 |
| Talkum Finntalk M 05 | Omya | Talc | 1.00 |
| Symuler Brilliant Carmine 6B 306 | DIC | PR 57:1 | 16.50 |
| Coconut oil | Lechner & Crebert | Coconut oil refined | 25.00 |
| Krumbhaar LR 10040 | Eastman | Phenolic modified rosin ester | 8.40 |
| Tergraf 902 | Cray Valley | Phenolic modified rosin ester | 16.90 |
| Additol VXL 12 | Surface Chemie | Aluminium gelling agent | 0.50 |
| | | | 100.00 |

EXAMPLE 8

Preparation of Ink

The following components were mixed to form a magenta ink, following essentially the same procedure as described in Examples 1-4. The amounts are parts by weight.

| Name | Supplier | Material | Amount |
| --- | --- | --- | --- |
| Citrofol B1 | Jungbunzlauer | Tributyl citrate | 8.00 |
| Uraplast 525 | DSM | Trialkyl mellitate | 49.00 |
| | | Sodium aluminium silicate | 0.80 |
| Talkum Finntalk M 05 | Omya | Talc | 1.00 |
| Symuler Brilliant Carmine 6B 306 | DIC | PR 57:1 | 16.50 |
| Krumbhaar LR 10040 | Eastman | Phenolic modified rosin ester | 11.30 |
| Tergraf 902 | Cray Valley | Phenolic modified rosin ester | 12.90 |
| Additol VXL 12 | Surface Chemie | Aluminium gelling agent | 0.50 |
| | | | 100.00 |

EXAMPLE 9

Preparation of Varnish

The following components were mixed to form a varnish, following essentially the same procedure as described in Examples 1-4. The amounts are parts by weight.

| Name | Supplier | Material | Amount |
|---|---|---|---|
| Coconut oil | Lechner & Crebert | Coconut oil refined | 27.00 |
| Liponate TDTM | Lipo Chemical Inc. | Tridecyl mellitate | 24.90 |
| MTBHQ | Eastman | t-butylhydroquinone | 0.10 |
| Tergraf ND 2030 | Cray Valley | Phenolic modified rosin ester | 16.00 |
| Tergraf 902 | Cray Valley | Phenolic modified rosin ester | 16.00 |
| Liponate TDTM | Lipo Chemical Inc. | Tridecyl mellitate | 14.00 |
| Additol VXL 12 | Surface Chemie | Aluminium gelling agent | 2.00 |
| | | | 100.00 |

EXAMPLES 10-13

Preparation of Ink

The components listed in Table 2 were mixed to form inks, following essentially the same procedure as described in Examples 1-4. The amounts are parts by weight.

TABLE 2

| | | | Example No. | | | |
|---|---|---|---|---|---|---|
| | | | 10 | 11 | 12 | 13 |
| Name | Supplier | Material | Yellow | Magenta | Cyan | Black |
| Talkum Finntalk M 05 | Omya | Talcum | 2.00 | 2.00 | 3.00 | — |
| Sunbrite Yellow M 05 | Sun Chemical | Pigment Yellow 13 | 12.00 | — | — | — |
| Diacetanil Orange R 3426C | Capelle | Pigment Orange 34 | 0.04 | — | — | — |
| Symuler Brilliant Carmin 6B 308 | DIC | Pigment Red 57:1 | — | 8.00 | — | 1.00 |
| Symuler Brilliant Carmin 6B 303 | DIC | Pigment Red 57:1 | — | 8.00 | — | — |
| Fastogen Blue H 5375 SD | DIC | Pigment Blue 15:3 | — | — | 16.00 | 4.00 |
| Specialblack 250 | Degusssa | Pigment Black 7 | — | — | — | 20.00 |
| Tergraf ND 2030 | Cray Valley | Phenolic modified rosin ester | 11.57 | 11.39 | 11.20 | 10.35 |
| Tergraf 902 | Cray Valley | Phenolic modified rosin ester | 11.57 | 11.39 | 11.20 | 10.35 |
| Liponate TDTM | Lipo Chemical Inc. | Tridecyl trimellitate | 39.16 | 36.88 | 36.37 | 33.72 |
| Coconut oil | Lechner & Crebert | Coconut oil refined | 21.00 | 19.70 | 19.60 | 18.00 |
| Printwax ME 0520 | Deurex | Polyethylene | 1.20 | 1.20 | 1.20 | 1.20 |
| Additol VXL 12 | Surface Chemie | Aluminium gelling agent | 0.59 | 0.57 | 0.56 | 0.52 |
| MTBHQ | Eastman | t-butylhydroquinone | 0.07 | 0.07 | 0.07 | 0.06 |
| Zeolite Powder 4A | Fischer | Sodium aluminium silicate | 0.80 | 0.80 | 0.80 | 0.80 |
| Total | | | 100.00 | 100.00 | 100.00 | 100.00 |

EXAMPLE 14

Preparation of Printed Material

Test prints were produced on a Heidelberg MO 4-colour press including a unit for application of water-based overprint varnishes. Press speed was between 7000-9000 sheets/hour, using a fountain solution containing 6-9% by volume isopropanol. Printing was carried out with standard optical densities, yellow=1.35, magenta=1.50, cyan=1.40 and black=1.80, using Fuji plates and Astral Premium blankets. The substrate used was Invercote G, which is a standard substrate for packaging. Prints were produced using a water-based overprint varnish. Rub tests were done after 24 hours, and all of the printing inks of the present invention gave satisfactory results.

EXAMPLE 15

Robinson Test

The odour and taint caused by the inks of the present invention were tested by the well known Robinson test.

This is a test originally devised by the Technical Committee of the International Office of Cocoa and Chocolate to determine whether odours from packaging materials are transferred to cocoa and chocolate products. It is now also used more generally to check on the odour and taint likely to transfer from packaging materials used in the food industry. The test was carried out as follows:

A petri dish containing about 25 g of fresh grated milk chocolate was placed in a clean 1 litre preserving jar. 16 representative round samples (9 cm diameter, total area of the 16 samples 1017 cm$^2$) of the packaging material to be evaluated were placed in the jar, so that sample and chocolate were not in contact with one another. A jar, the "blank", in all respects similar, but without any sample and a jar with unprinted substrate, were also prepared. The jars were closed with a lid. They were then stored for 24 hours in a dark, odourless place at 23° C. A panel of tasters then compared the odour and then the flavour of the chocolate in each sample jar with the chocolate in the blank. The results were evaluated on the following scale:

0=No difference in odour/flavour
1=Odour/Flavour difference just perceptible
2=Noticeable change in odour/flavour
3=Significant change in odour/flavour
4=Intense change in odour/flavour Four-colour (Black, Cyan, Magenta, Yellow) prints were produced by printing as described in Example 14, and were then tested. The sets of inks used were: Set A, standard offset inks, Irocart Process Inks, a set of currently available Sun Chemical conventional sheetfed offset inks containing driers; Set B, Irocart GN Low Hex ink, a set of currently available Sun Chemical conventional sheetfed offset inks formulated for low odour and low taint; Set C, the inks of Examples 1-4; and Set D, the ink of Example 7, and black, cyan and yellow inks prepared in the same way as that of Example 7. The results are shown in Table 3 below.

TABLE 3

| Sample | Odour rating | Taint rating |
| --- | --- | --- |
| Blank | 0 | 0 |
| Blank substrate | 0.5 | 0 |
| Set A | 3.5 | 3.0 |
| Set B | 0.5 | 0.5 |
| Set C | 0.5 | 0.5 |
| Set D | 1.5 | 0.5 |
| Ink from U.S. Pat. No. 6,613,813 | 1.5 | 1.0 |
| Reference/blank | 0 | 0 |

It can be seen from these results that the compositions of the present invention (Examples 1 and 7) gave printed matter having comparable or better odour and comparable or lesser taint than the product of U.S. Pat. No. 6,613,813.

EXAMPLE 16

Migration Test

Prints were prepared as described in Example 14 using the inks of Examples 1-4, or—for inks of Example 8—using a standard Prüfbau laboratory proofing press.

In all cases, the prints were individually placed in a petri dish, and 1 g of clean Tenax® (an absorbent used to simulate dry and/or fatty foods; available from Akzo Nobel) was placed on the reverse of each print. After 10 days at 40° C., the Tenax® was extracted into diethyl ether and analysed using GC-MS (Gas Chromatography-Mass Spectrometry). The materials analysed for were Uraplast 525, Citrofol BI, coconut oil and the solvent used in U.S. Pat. No. 6,613,813, of which one trade name is Radia 7187. None was found within the detection limits of the analysis.

The invention has been described in terms of preferred embodiments thereof, but is more broadly applicable as will be understood by those skilled in the art. The scope of the invention is only limited by the following claims.

The invention claimed is:

1. An offset printing ink or varnish comprising a solvent wherein the solvent comprises at least one water-insoluble ester of a polycarboxylic acid having more than 2 carboxylic acid groups with a monohydric alcohol having at least 4 carbon atoms.

2. An offset printing ink or varnish according to claim 1, wherein from 45% to 90% by weight of said solvent comprises an ester of a polycarboxylic acid with an alcohol having at least 4 carbon atoms.

3. An offset printing ink or varnish according to claim 2, wherein from 50% to 80% by weight of said solvent comprises an ester of a polycarboxylic acid with an alcohol having at least 4 carbon atoms.

4. An offset printing ink or varnish according to claim 2, wherein from 55% to 65% by weight of said solvent comprises an ester of a polycarboxylic acid with an alcohol having at least 4 carbon atoms.

5. An offset printing ink or varnish according to claim 1, wherein said alcohol has from 4 to 20 carbon atoms.

6. An offset printing ink or varnish according to claim 5, wherein said alcohol has from 6 to 10 carbon atoms.

7. An offset printing ink or varnish according to claim 1, wherein said polycarboxylic acid has 3 or 4 carboxylic acid groups.

8. An offset printing ink or varnish according to claim 1, wherein said polycarboxylic acid is an aromatic polycarboxylic acid.

9. An offset printing ink or varnish according to claim 8, wherein said polycarboxylic acid is a benzenepolycarboxylic acid.

10. An offset printing ink or varnish according to claim 9, wherein said benzenepolycarboxylic acid is trimellitic acid.

11. An offset printing ink or varnish according to claim 10, wherein the ester is an ester of trimellitic acid with one or more straight chain saturated $C_8$-$C_{10}$ aliphatic alcohols.

12. An offset printing ink or varnish according to claim 10, wherein the ester is tridecyl trimellitate.

13. An offset printing ink or varnish according to claim 7, wherein the ester is an ester of citric acid or acetylcitric acid.

14. An offset printing ink or varnish according to claim 7, wherein said ester is the butyl ester.

15. An offset printing ink or varnish according to claim 1, wherein said solvent additionally comprises at least one triglyceride of $C_8$-$C_{20}$ aliphatic carboxylic acids.

16. An offset printing ink or varnish according to claim 15, wherein said triglyceride is a triglyceride of $C_{10}$-$C_{18}$ aliphatic carboxylic acids.

17. An offset printing ink or varnish according to claim 16, wherein said triglyceride is coconut oil.

* * * * *